(12) United States Patent
Nakano

(10) Patent No.: US 7,111,031 B2
(45) Date of Patent: Sep. 19, 2006

(54) DUAL PROCESSOR HAVING A FUNCTION CALCULATING THE SUM OF THE RESULTS OF A PLURALITY OF ARITHMETIC OPERATIONS

(75) Inventor: Takahiko Nakano, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 723 days.

(21) Appl. No.: 10/271,771

(22) Filed: Oct. 17, 2002

(65) Prior Publication Data

US 2003/0079110 A1      Apr. 24, 2003

(30) Foreign Application Priority Data

Oct. 18, 2001    (JP)    ............... 2001-320358

(51) Int. Cl.
   *G06F 7/38*    (2006.01)
(52) U.S. Cl. ...................... 708/490; 708/603
(58) Field of Classification Search ............... 708/490, 708/603
   See application file for complete search history.

(56) References Cited

U.S. PATENT DOCUMENTS 5,826,096 A * 10/1998 Baxter ...................... 712/24
5,892,696 A * 4/1999 Kozu ........................ 708/490
6,484,253 B1 * 11/2002 Matsuo ...................... 712/212
6,958,718 B1 * 10/2005 Symes et al. ............... 341/106

FOREIGN PATENT DOCUMENTS

| JP | A-6-60206 | 3/1994 |
|----|-----------|--------|
| JP | A-8-329038 | 12/1996 |

* cited by examiner

*Primary Examiner*—Tan V. Mai
(74) *Attorney, Agent, or Firm*—Birch, Stewart, Kolasch & Birch, LLP

(57) ABSTRACT

A data driven information processor circulates a data packet therein, while in accordance with a previously prepared data flow program the processor performs a plurality of types of operation including performing an arithmetic operation on data and accumulating a result of the arithmetic operation in an accumulation operation performed repeatedly. The accumulation operation is performed in the information processor only at a product-sum operation portion. While the operation is being performed, a data packet having stored therein data to be accumulated is not required to circulate round a loop formed of other components of the information processor. The accumulation operation can thus be performed fast.

9 Claims, 14 Drawing Sheets

DUAL PROCESSOR HAVING A FUNCTION CALCULATING THE SUM OF THE RESULTS OF A PLURALITY OF ARITHMETIC OPERATIONS

BACKGROUND OF THE INVENTION

1. Field of the Invention

The present invention relates generally to data processors and particularly to those having a function performing an operation calculating a plurality of sums for a result of an arithmetic operation.

2. Description of the Background Art

By the Applicant, techniques used in a data driven information processor to perform a product-sum operation (an operation to calculate the sum of a plurality of products) are disclosed in Japanese Patent Laying-Open Nos. 6-60206 and 8-329038. The disclosures in the publications are based on to hereinafter describe a product-sum operation performed in a data driven information processor.

A data driven information processor processes data in an order in which the data become executable. As such, a program can be executed regardless of the order of entry of data and data can thus be processed in parallel.

FIG. 14 shows a configuration of a data driven information processor as disclosed in Japanese Patent Laying-Open No. 6-60206, and FIGS. 15A and 15B show configurations in field of data packets in the FIG. 14 information processor. FIG. 15A shows a data packet 36 containing a field 51F having generation information stored therein, a field 52F having instruction information stored therein, a field 53F having destination information stored therein, and a field 54F having data stored therein. FIG. 15B shows a data packet 38 corresponding to data packet 36 with field 54F substituted by fields 54FA and 54FB each having data stored therein.

The FIG. 14 data driven information processor includes an input/output control portion 1, a program storage portion 2, a data pair generation portion 3, and an operation portion 4. The data driven information processor uses data packet 36 or 38 to externally communicate data. Input/output control portion 1 temporarily stores therein data packet 36 received external to the information processor or from operation portion 4, reads generation and destination information of the stored data packet, and in accordance with the read information outputs data packet 36 external to the information processor or to program storage portion 2 selectively.

Program storage portion 2 stores a data flow program having a plurality of sets formed of destination information and instruction information. When program storage portion 2 receives data packet 36 of FIG. 15A, it reads subsequent destination information and subsequent instruction information from the data flow program by addressing based on destination information of the received data packet 36, stores the read destination and instruction information to the received data packet 36 at fields 53F and 52F, respectively, and outputs the received data packet 36.

Data pair generation portion 3 receives data packet 36 from program storage portion 2, and if it is necessary, as determined in accordance with the instruction information in field 52F of the received data packet 36, data pair generation portion 3 stores data to data field 54F for executing the instruction information and outputs the received data packet 36. Otherwise, data pair generation portion 3 outputs the received data packet 36 as it is.

More specifically, data pair generation portion 3 receives data packet 36 from program storage portion 2 and allows a waiting of data packet 36 based on the packet's instruction information, as required. More specifically, if in accordance with the instruction information a decision is made that a waiting is required, two different data packet 36 matching in generation and destination information are detected and one of the detected two data packets 36 has its content of field 54F additionally stored to field 54F of the other data packet 36 so that the other data packet 36 is output in the configuration of data packet 38 shown in FIG. 15B. If a decision is made that a waiting is not required, the waiting is not provided and data packet 36 is output as it is.

Operation portion 4 receives data packet 38 or 36 from data pair generation portion 3, decodes the instruction information stored in the data packet at field 52F. In accordance with a result of the decoding, operation portion 4 performs an operation on data stored in the received data packet, stores a result of the operation to the received data packet as data, and outputs the data packet in the form of data packet 36 as shown in FIG. 15B.

Data packet 36 or 38 thus continues to circulate round a ring of input/output control portion 1, program storage portion 2, data pair generation portion 3 and operation portion 4 to allow an operation to proceed in accordance with the data flow program stored in program storage portion 2.

The data flow program stored in program storage portion 2 is represented by describing a flow of a data packet. This program description will be referred to as a "data flow graph." FIG. 16 shows a data flow graph corresponding to a product-sum operation performed in the FIG. 14 data driven information processor. The FIG. 16 data flow graph has nodes ND1–ND5 and ND10 and an arrow connecting each node. The arrow indicates a data flow. Nodes ND1 and ND2 indicate input nodes for inputting data and node ND10 indicates an output node for outputting data. Nodes ND3–ND5 are assigned instruction information, respectively, executed in operation portion 4. To perform an operation according to the instruction information assigned to nodes ND3–ND5, respectively, a corresponding data packet circulates round the FIG. 14 loop formed by input/output control portion 1 through operation portion 4. As such, performing a product-sum operation once in accordance with the FIG. 16 data flow graph requires circulating round the loop of the information processor of FIG. 14 more than once.

With reference to the FIG. 14 processor and the FIG. 16 graph, a procedure of a product-sum operation in accordance with the following equation:

$$ACC = ACC + X*Y \qquad (1)$$

will be described, wherein ACC represents accumulation data, and X and Y represent operands (data to be operated on).

When expression (1) is executed in the FIG. 14 processor, in the FIG. 16 graph nodes ND1 and ND2 are assigned "Y" and X", respectively, and node ND3 is assigned "X" and "Y" and instruction information (a multiplication instruction "MUL") assign to node ND3 is executed and the operation's result is obtained. During this period, data flows, as follows: when data packet 36 having field 54F with "X" stored therein is output via input/output control portion 1 to program storage portion 2, in program storage portion 2 subsequent instruction information and destination information are read by addressing based on destination information of data packet 36, and they are stored to data packet 36 at fields 52F and 53F, respectively, and data packet 36 is output to data pair generation portion 3 and waits in data pair generation portion 3 for entry of data packet 36 having stored therein data ("Y") paired therewith.

A procedure similar to the above is followed to process data packet 36 having field 54F with "Y" stored therein. More specifically, data packet 36 is fed via input/output control portion 1 to program storage portion 2, where it has the subsequent instruction information and destination information stored thereto and it is then output to data pair generation portion 3, where a data pair of the received data packet and data packet 36 having waited with "X" stored therein is detected and data packet 38 having a data pair ("X" and "Y") stored at fields 54FA and 54FB is generated and output to operation portion 4, where in accordance with instruction information of data packet 38 "X" and "Y" are multiplied and data packet 36 storing the multiplication at field 54F is output to input/output control portion 1.

The multiplication thus obtained flows in the FIG. 16 graph, as follows: the multiplication follows an arrow to enter a left hand of node ND5, while node ND5 has a right input receiving a value of an accumulation provided at node ND4. In accordance with instruction information (an addition instruction indicated by "ADD") assigned to node ND5 a procedure similar to that followed for the aforementioned instruction information ("MUL") is followed to add the multiplication and the accumulation together. The addition is then fed to stored in node ND4. This storage is also regarded as a single operation. As such, in accordance with the FIG. 16 graph, performing a product-sum operation once entails circulating data round the FIG. 14 loop three times.

As disclosed in Japanese Patent Laying-Open Nos. 6-60206 and 8-329038, data can circulate round the loop a reduced number of times to perform an operation faster.

In Japanese Patent Laying-Open No.6-60206 the FIG. 14 operation portion 4 is provided with an accumulator to perform a product-sum operation. With an accumulator incorporated in operation portion, as described above, a data driven information processor performs a production-sum operation, as represented in the data flow graph shown in FIG. 17. The FIG. 17 graph indicates that the FIG. 16 nodes ND3–ND5 are represented by a single node ND7 and simply executing an instruction information (a product-sum operation instruction "MULA") assigned to node ND7 can achieve a product-sum operation.

If the FIG. 17 graph is applied to perform expression (1), data flows, as follows: two arrows to node ND7 are respectively assigned "X" and "Y" to execute product-sum operation instruction MULA.

More specifically, in the FIG. 14 processor, data packet 36 having field 54F with "X" stored therein is fed through input/output control portion 1 to program storage portion 2, where subsequent destination information and instruction information are stored to fields 53F and 52F, respectively, and data packet 36 is output to data pair generation portion 3 and waits there for entry of data ("Y") paired therewith.

In accordance with a procedure similar to the above, data packet 36 having field 54F with "Y" stored therein is fed through input/output control portion 1 to program storage portion 2, where subsequent destination information and instruction information are stored to fields 53F and 52F, respectively, and data packet 36 is fed to data pair generation portion 3. In data pair generation portion 3 a data pair of input data packet 36 and data packet 36 having waited with "X" stored therein is detected and data packet 38 having fields 54FA and 54FB with "X" and "Y" stored therein is obtained and output to operation portion 4.

Operation portion 4 performs an operation based on content of data packet 38 and outputs data packet 36 with a result of the operation stored at fields 54F. In doing so, operation portion 4 allows a multiplication of "X" and "Y" to be accumulated by the accumulator therein and data packet 36 is output with the accumulation stored at field 54F.

Thus operation portion 4 incorporating an accumulator allows the FIG. 17 process to complete a product-sum operation by one third of a loop circulation frequency required for a product-sum operation performed in accordance with the FIG. 16 graph.

Furthermore in the data processor as disclosed in Japanese Patent Laying-Open No.8-329038 a data packet is provided with an additional field serving as an accumulator to implement a product-sum operation. The data driven information processor disclosed in the publication has operation portion 4 improved as shown in FIG. 18. Operation portion 4 includes an operation circuit 24, an addition circuit 28, a shifter 30 and a selector 32. Operation portion 4 receives a data packet 42 having fields 51F-53F, as aforementioned, fields 62F and 64F storing data therein, and a field 66F storing therein data ACC of an accumulation of product-sum operations. Operation portion 4 outputs a data packet 40 having fields 51F–53F, as aforementioned, a field 58F storing data therein, and a field 60F storing accumulation data ACC therein.

Field 52F of data packet 42 fed to operation portion 4 contains instruction information providing operation circuit 24, shifter 30 and selector 32 with content of an operation to be performed in operation circuit 24, shiftability by shifter 30, and information on selection of input data by selector 32 and selection of a destination of data, respectively.

In operation, fields 62F and 64F in data packet 42 fed to operation portion 4 have stored therein operands ("X" and "Y") which are fed to operation circuit 24 and processed in accordance with corresponding instruction information and a result thereof is added by adder 28 to corresponding accumulation data ACC. The addition is shifted by shifter 30 by shiftability indicated by corresponding instruction information and it is then fed to selector 32. Selector 32 receives a value output from shifter 30, a value output from adder 28 and accumulation data ACC of field 66F and makes a decision based on corresponding instruction information as to which of the inputs is selected. In accordance with the decision, output data packet 40 can have field 60F updated in value, a result can be output to field 58F, an output from shifter 30 can be stored to field 58F, an output from adder 28 can be stored to field 60F, or the like.

While thus providing data packet 42 or 40 with data field 60F or 66F for storing accumulation data ACC renders the data packet large, data operation order or any other similar constraint can be eliminated to efficiently perform a product-sum operation.

The above-described, conventional product-sum operation process performs a single product-sum operation in a single operation as it is applied mainly to image data processing and it is intended to prevent a data packet residing in an information processor from resulting in poor efficiency of processing data. Accordingly, performing a product more than once entails circulating a data packet in a data driven information processor by the frequency of the product. With such a system, it is not suitable for example for finite impulse response (FIR) filtering or any other similar process increasing the frequency of execution of a product for a single product-sum operation. For example, for an FIR filtering of no more than 10 taps (i.e., product-sum is performed ten times), a data packet needs to circulate in a data driven information processor ten times. This means that the data packet moves past input/output control portion 1 through operation portion 4 ten times. If the data packet requires one unitary period of time to move past each portion, it would require as many as 40 unitary periods of time to circulate in the data driven information processor ten times.

SUMMARY OF THE INVENTION

One object of the present invention is to provide a data processor capable of rapidly calculating a sum of results of a plurality of arithmetic operations. To achieve the above object the present invention in one aspect provides a data processor including a program storage portion, a paired-data detection portion, an accumulation portion, an operation portion, a branch portion, and an input/output control portion.

The program storage portion has stored therein a data flow program formed of a plurality of destination information and a plurality of instruction information. When the program storage portion receives a data packet at least having a destination field for storage of the destination information, an instruction field for storage of the instruction information and a data field for storage of data, the program storage portion reads subsequent destination information and subsequent instruction information from the data flow program, as addressed in accordance with content of the destination field of the received data packet. The program storage portion stores the read subsequent destination and instruction information to the destination and instruction fields, respectively, of the received data packet and outputs the data packet.

The paired-data detection portion receives the data packet from the program storage portion, stores to the received data packet a content required to execute the instruction information in the instruction field of the received data packet, and outputs the data packet.

The accumulation portion has a plurality of tables with data registered therewith. When the accumulation portion receives the data packet, the accumulation portion performs in accordance with the instruction information in the instruction field of the received data packet an arithmetic operation on the data read from the plurality of tables, accumulates a result of the arithmetic operation in an accumulation operation performed repeatedly, stores a result of the repetitive accumulation operation to the data field of the received data packet, and outputs the data packet.

The operation portion receives the data packet, processes the data in a corresponding the data field in accordance with the instruction information in the instruction field of the received data packet, stores resultant processed data to the data field of the received data packet and outputs the data packet.

The branch portion receives the data packet from the paired-data detection portion and outputs the received data packet to one of the accumulation portion and the operation portion in accordance with the instruction information in the instruction field of the received data packet.

The input/output control portion receives the data packet from the accumulation portion and the operation portion and outputs the data packet externally or to the program storage portion.

In the present data processor data a process repeating an arithmetic operation on data and an accumulation of a result of the arithmetic operation is performed only in the accumulation portion and while the arithmetic operation and the accumulation are repeated a data packet does not need to circulate each portion of the data processor. Therefore, data can arithmetically be operated on and a result thereof can be accumulated to obtain a sum thereof in an accumulation operation rapidly.

Furthermore, while in the accumulation portion data is arithmetically operated on and a result thereof is accumulated in an accumulation operation performed repeatedly, the operation portion performs a different processing in parallel. Therefore, while data is arithmetically operated on and a result thereof is accumulated in an accumulation operation performed repeatedly, a data packet's residence in the processor can also be reduced. Consequently, a processing can be proceeded with in accordance with subsequent instruction information according to a data flow program using a data packet.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 13A–13C represent exemplary operations of a sixth embodiment;

DESCRIPTION OF THE PREFERRED EMBODIMENTS

Hereinafter the present invention in embodiments will be described with reference to the drawings. Herein, data packet 36 or 38 as aforementioned is used, although for the sake of clarity a process performed with reference to generation information will not be referred to.

First Embodiment

In the first embodiment there is provided a product-sum operation portion having two data tables and also receiving constant data CN indicative of a product repetition frequency required for a product-sum operation to output a result of the product-sum operation. More specifically, this product-sum operation portion uses constant data CN to perform an operation according to an arithmetic expression ACC=ACC+X(i)*Y(i) to obtain accumulation data ACC, wherein i=0 to (CN−1).

Figure 1:
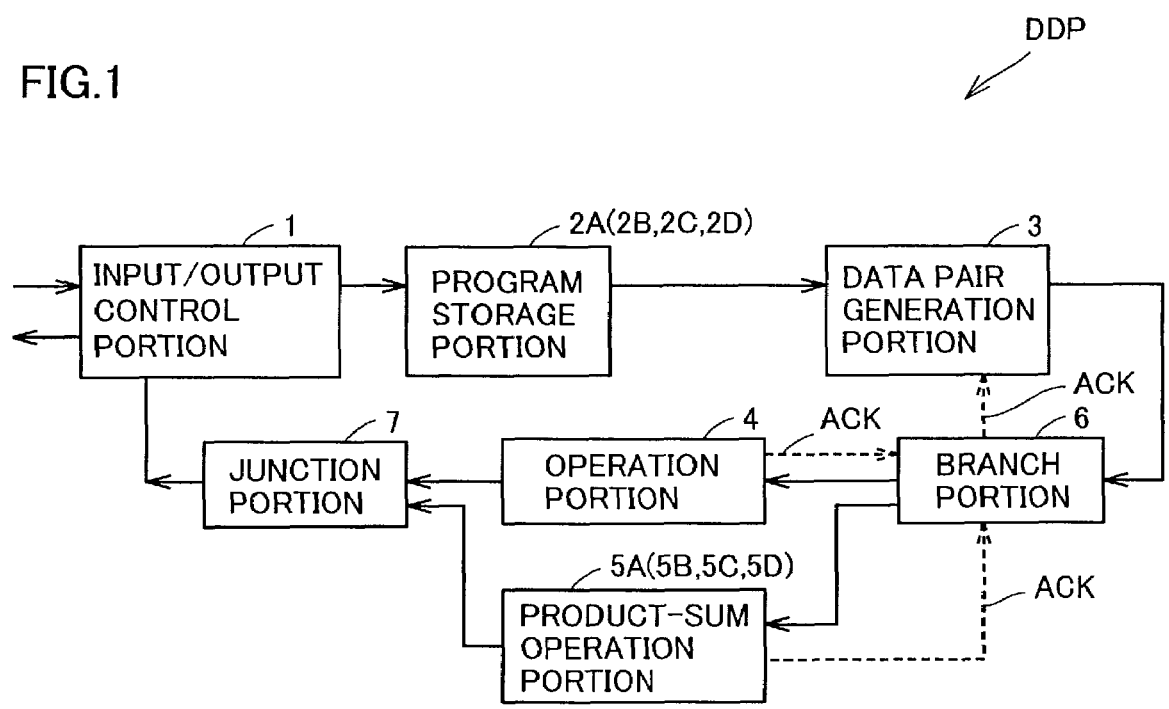
FIG. 1 shows a configuration of a data driven information processor of the present invention in each embodiment.

FIG. 1 shows a configuration of a data driven information processor DDP in accordance with each embodiment. The FIG. 1 data driven information processor DDP includes an input/output control portion 1, a program storage portion 2A (2B, 2C, 2D), a data pair generation portion 3, an operation portion 4, a product-sum operation portion 5A (5B, 5C, 5D), a branch portion 6, and a junction portion 7. Program storage portions 2A, 2B, 2C and 2D are applied to first, second, third and fourth embodiments, and product-sum operation portions 5A, 5B, 5C and 5D are applied to the first, second, third and fourth embodiments, respectively.

Branch portion 6 receives a data packet from data pair generation portion 3 and in accordance with instruction information of the received data packet outputs the data packet to operation portion 4 or product-sum operation portion 5A (5B, 5C, 5D). More specifically, branch portion 6 outputs the received data packet to product-sum operation portion 5A (5B, 5C, 5D) when instruction information of the received packet indicates a product-sum operation instruction. Otherwise, branch portion 6 outputs the packet to operation portion 4. Junction portion 7 receives data packets from operation portion 4 and product-sum operation portion 5A (5B, 5C, 5D), respectively, and outputs them to input/output control portion 1 in order.

Product-sum operation portions 5B, 5C, 5D and program storage portions 2B, 2C, 2D will be described hereinafter in the second, third and fourth embodiments. A signal ACK shown in FIG. 1 will be described hereinafter in a fifth embodiment.

Figure 2:
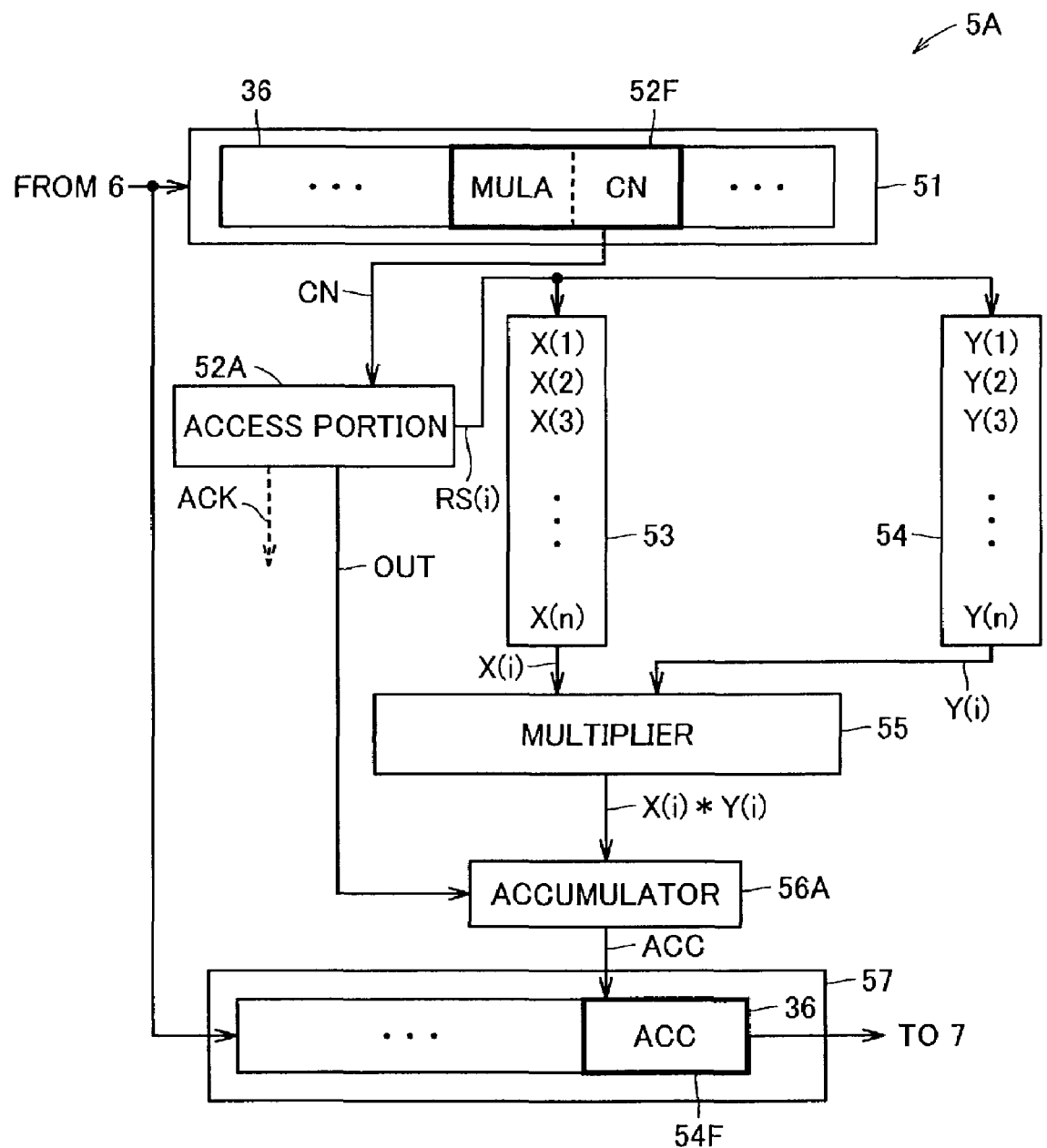
FIG. 2 shows a configuration of a product-sum operation portion 5A of a first embodiment.
Figure 3:
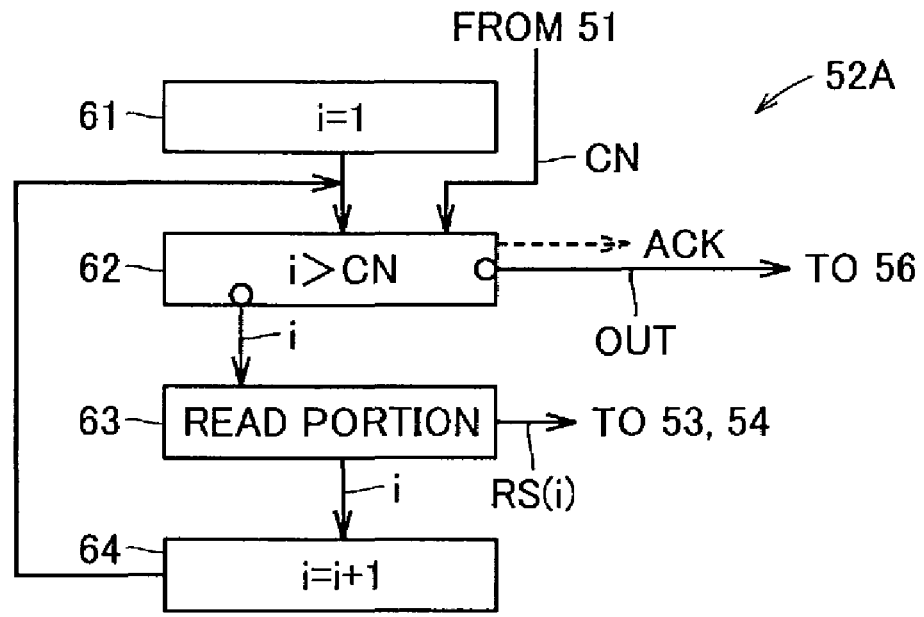
FIG. 3 shows a configuration of an access portion 52A of FIG. 2.

FIG. 2 shows a configuration of product-sum operation portion 5A of the first embodiment. As shown in FIG. 2, product-sum operation portion 5A includes an input buffer 51, an access portion 52A, a data table 53 storing a variable X(i), a data table 54 storing a variable Y(i), a multiplier 55, an accumulator 56A, and an output buffer 57, wherein i=1, 2, 3, . . . , n. Input and output buffers 51 and 57 receive data packet 36 from branch portion 6. FIG. 3 shows a configuration of access portion 52A of the FIG. 2.

Figure 4:
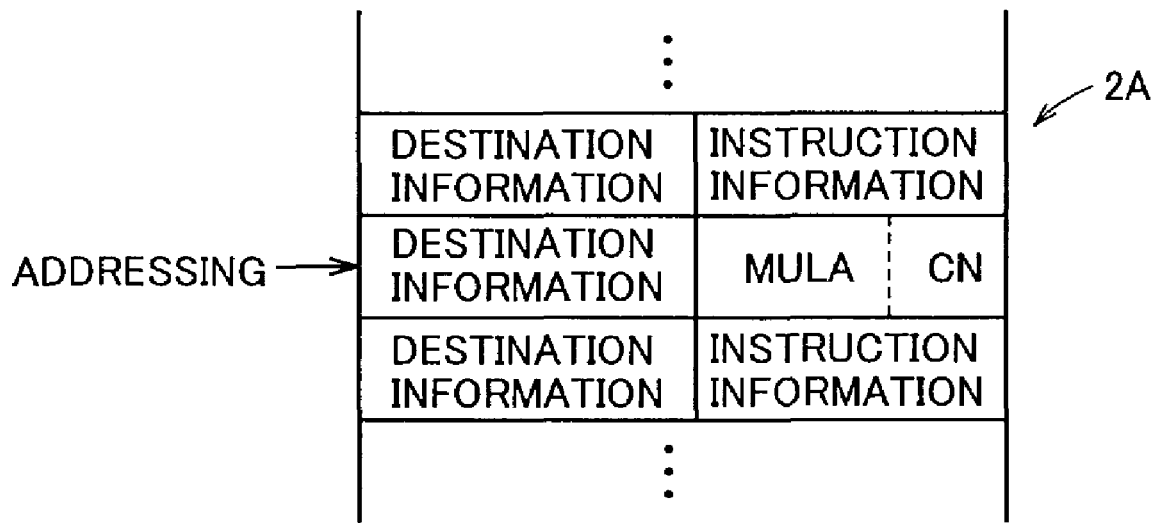
FIG. 4 shows exemplary content of a program storage portion 2A of the first embodiment.

FIG. 4 shows exemplary content of program storage portion 2A of the first embodiment. As shown in FIG. 4, program storage portion 2A has a data flow program previously stored therein. The data flow program is formed of a plurality of destination information and a plurality of instruction information. In the first embodiment when a product-sum operation instruction is executed a process is effected, as follows: as addressed in accordance with destination information of data packet 36, subsequent destination information and subsequent instruction information formed of an instruction code MULA and constant data CN for a product-sum operation are read from the data flow program in program storage portion 2A. The read subsequent destination and instruction information are stored to the data packet 36 at fields 53F and 52F, respectively, and the data packet 36 is output. Note that constant data CN defines a frequency of repeating an accumulation operation. This accumulation operation is a series of operations: reading data X(i) and Y(i) from data tables 53 and 54, multiplying them by each other in multiplier 55, and accumulating resultant multiplication data X(i)*Y(i) in accumulator 56A.

Data packet 36 having instruction code MULA stored therein that is output from program storage portion 2A moves past data packet 36, i.e., it does not wait for data in data pair generation portion 3 and it is fed to branch portion 6. Branch portion 6 receives data packet 36 and in accordance with instruction code MULA of the received data packet 36 outputs data packet 36 to production-sum operation portion 5A.

With reference to FIG. 2, data packet 36 fed from branch portion 6 to product-sum operation portion 5A is stored to input and output buffers 51 and 57. When data packet 36 is stored to input buffer 51, constant data CN in field 52F of the data packet 36 is fed to access portion 52A Data table 53 has n regions (n≧CN), each having previously stored therein data X(i) required for a product-sum operation, and data table 54 similarly has data Y(i) previously stored therein. Access portion 52A operates in accordance with fed constant data CN to generate a signal RS(i) in order for access and in response to signal RS(i) to access data tables 53 and 54 in parallel. Thus from data tables 53 and 54 data X(i) and Y(i) are read and fed to multiplier 55. When access portion 52A completes reading data from data tables 53 and 54 in accordance with constant data CN, access portion 52A outputs a signal OUT to accumulate 56A.

Multiplier 55 receives X(i) and Y(i) fed in parallel, multiplies them by each other, and feeds resultant multiplication data X(i)*Y(i) to accumulator 56A. Accumulator 56A is initialized whenever input buffer 51 receives data packet 36. For example, accumulator 56A is initialized by a value of 0 being stored. After its initialization, accumulator 56A receives multiplication data X(i)*Y(i) from multiplier 55, adds the data and previously stored content together, and stores the resultant addition. Thereafter, the above process is repeated whenever multiplication data X(i)*Y(i) is fed.

Thereafter when accumulator 56A receives signal OUT from access portion 52 it outputs its currently stored content to output buffer 57 as accumulation data ACC. The fed accumulation data ACC is stored to field 54F of data packet 36 received and stored in output buffer 57. Thereafter, data packet 36 is read from output buffer 57 and output to junction portion 7.

While herein accumulator 56A is initialized to the value of 0, it may have an initial value other than 0. For example, a previous accumulation's value may exactly be maintained.

With reference to FIG. 3, access portion 52A includes a register 61 for a variable "i", a comparator 62, a read portion 63, and an incrementer 64. Register 61 previously stores therein variable "i"=a value of "1" to indicate a top address of data tables 53 and 54. In operation, comparator 62 compares constant data CN fed from input buffer 51 and variable "i" fed from incrementer 64 or input buffer 60 in value in accordance with a relation i>CN. For i≦CN, variable "i" is fed to read portion 63. Otherwise, signal OUT is output to accumulator 56.

Read portion 63 receives variable "i" and in accordance with the variable outputs signal RS(i) to data tables 53 and 54 and also feeds the variable to incrementer 64. Incrementer 64 receives the variable, increments it by one, and feeds the incremented variable to comparator 62.

As such in product-sum operation portion 5A when single instruction information formed of instruction code MULA and constant data CN is executed a product-sum operation can be performed in accordance with arithmetic expression ACC=ACC+X(i)*Y(i) to obtain accumulation data ACC indicating a result of a product-sum operation related to data in data tables 53 and 54, wherein i=1 to CN. Instruction information of a data packet input to product-sum operation portion 5A, as described above, includes data CN designating a frequency of repeating an accumulation operation. This instruction information is information read from the data flow program stored in program storage portion 2A, and the data flow program can be used to designate the frequency, as desired.

Second Embodiment

In the second embodiment, constant data K and CN are used. In the present embodiment, a plurality of accumulators are provided, of which an accumulator used to perform a product-sum operation once is designated by constant data K. In the present embodiment, a process is effected in accordance with an arithmetic expression ACC(K)=ACC(K)+X(i)*Y(i) to obtain accumulation data ACC (k) for a designated accumulator, wherein i=1 to CN.

Figure 5:
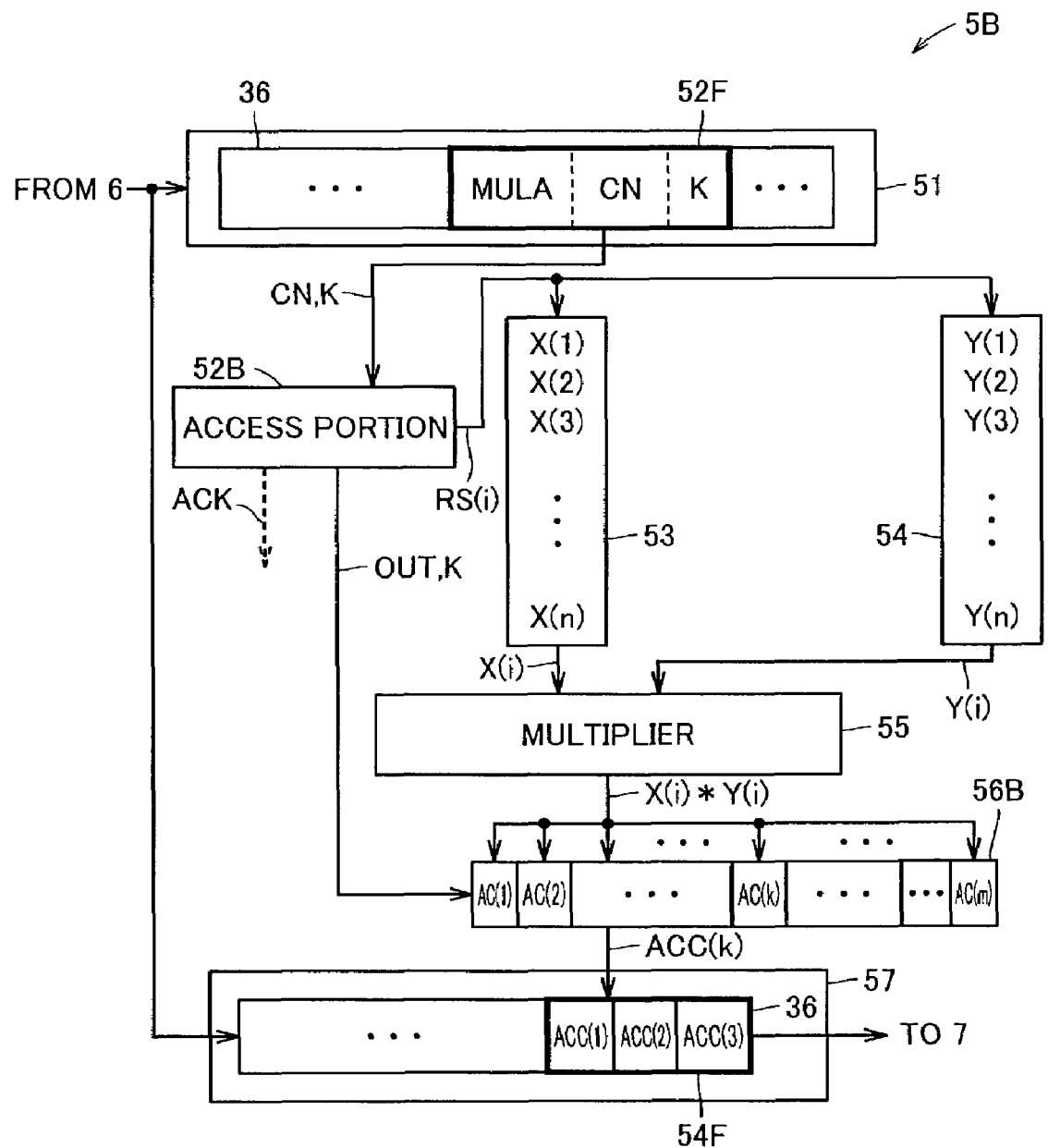
FIG. 5 shows a configuration of a product-sum operation portion 5B of a second embodiment.
Figure 6:
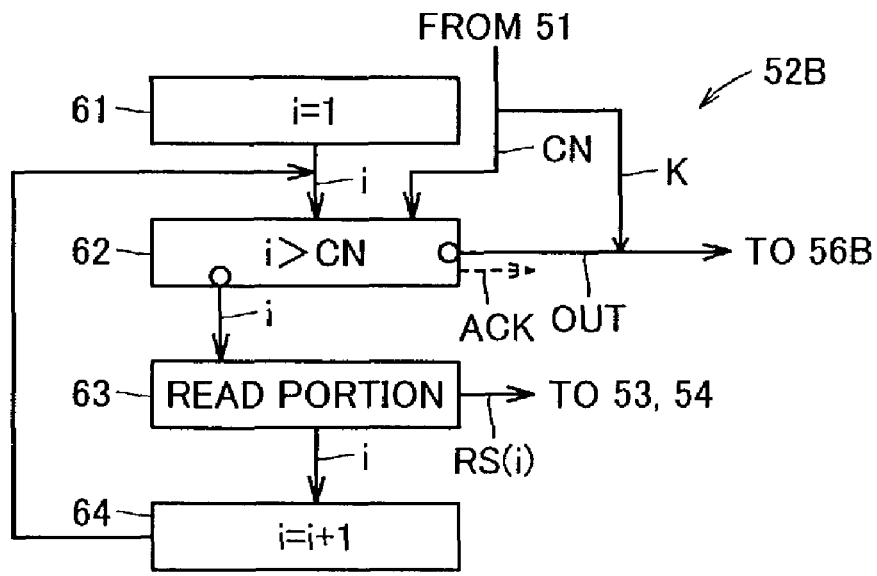
FIG. 6 shows a configuration of an access portion 52B of FIG. 5.

FIG. 5 shows a configuration of a product-sum operation portion 5B of the second embodiment. As shown in the figure, product-sum operation portion 5B includes an input buffer 51, an access portion 52B, a data table 53, a data table 54, a multiplier 55, an accumulator group 56B, and an output buffer 57. Input and output buffers 51 and 57, data tables 53 and 54, and multiplier 55 are similar to those of the first embodiment and will thus not be described. FIG. 6 shows a configuration of access portion 52B of FIG. 5.

Figure 7:
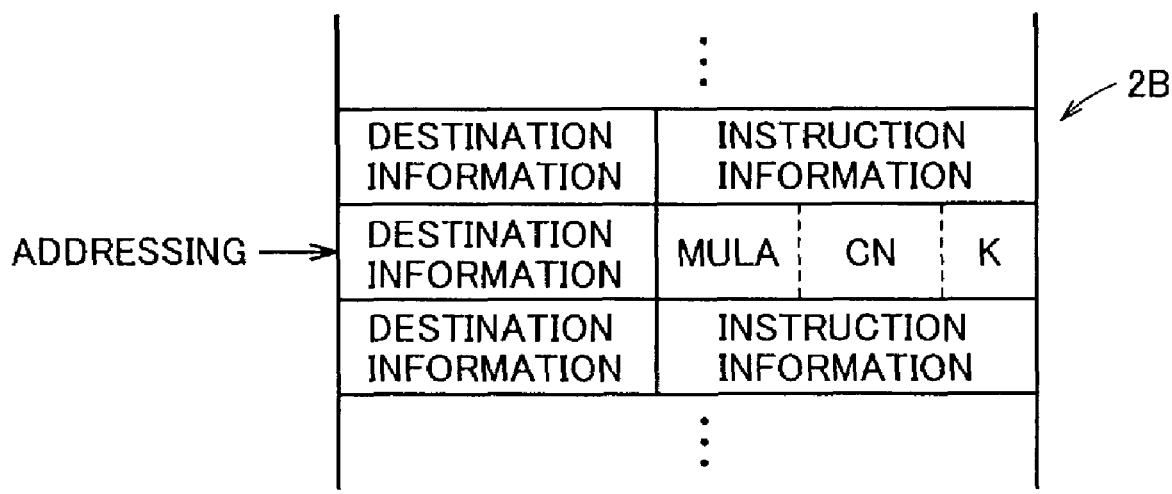
FIG. 7 shows exemplary content of program storage portion 2B of the second embodiment.

FIG. 7 shows exemplary content of program storage portion 2B of the second embodiment. In the figure, program storage portion 2B previously stores a data flow program, as has been described previously.

In the second embodiment when a product-sum operation instruction is executed a process is effected, as follows: as addressed in accordance with destination information of data packet 36 received, subsequent destination information and subsequent instruction information formed of instruction code MULA and constant data CN and K are read from the data flow program in program storage portion 2B. The read, subsequent destination and instruction information are stored to the received data packet 36 at fields 53F and 52F, respectively. Thereafter, the received data packet 36 is output. Note that constant data K is information provided to designate an accumulator of accumulator group 56B that is activated, as will be described hereinafter.

Data packet 36 fed from branch portion 6 to product-sum operation portion 5B is stored to input and output buffers 51 and 57. When data packet 36 is stored to input buffer 51, constant data CN and K in field 52F of the stored packet 36 are fed to access portion 52B. Access portion 52B operates in accordance with fed constant data CN to generate a signal RS(i) in order and in response to signal RS(i) reads data X(i) and Y(i) from data tables 53 and 54 in parallel and outputs the data to multiplier 55. When access portion 52A completes reading data from data tables 53 and 54 in accordance with constant data CN, access portion 52A outputs a signal OUT to accumulator group 56B. Multiplier 55 receives X(i) and Y(i) fed in parallel, multiplies them by each other, and feeds resultant multiplication data X(i)*Y(i) to accumulator group 56B.

Accumulator group 56B has a plurality of accumulators AC(k) to store a plurality of results of a product-sum operation, wherein k=1, 2, 3, ..., m. When accumulator group 56B receives constant data K, at least one accumulator AC (k) is activated, as designated in accordance with constant data K. Accumulation data X(i)*Y(j) output from multiplier 55 is fed to all of the accumulators AC(k) of accumulator group 56B, although only accumulator AC(k) activated by constant data K can receive multiplication data X(i)*Y(j).

As such in accumulator group 56B only one accumulator AC(k) or more that is/are activated by constant data K accumulate(s) multiplication data X(i)*Y(j), as described in the first embodiment. Thereafter when accumulator group 56B receives signal OUT the active accumulator(s) AC(k) each respond to signal OUT by outputting its/their currently stored accumulation data ACC(K) to output buffer 57.

Output buffer 57 stores the fed, one or more accumulation data ACC (k) to field 54F of data packet 36 previously stored in output buffer 57. Thereafter, the data packet 36 is read from output buffer 57 and output to junction portion 7.

FIG. 5 shows that, with constant data K indicating 3, by way of example, accumulator group 56B has three accumulators AC(1), AC(2) and AC(3) activated.

Note that herein, as well as in the first embodiment, accumulator group 56B has accumulators AC(k) each having an initial value of 0. However, the accumulator may have an initial value other than 0. A previous accumulation's value may exactly be maintained.

The FIG. 6 access portion 52B is similar in configuration to the aforementioned access portion 52A, except that access portion 52B receives constant data CN and K from input buffer 51 and constant data CN is fed to comparator 62, as has been described previously, whereas constant data K moves past access portion 52B and is fed to accumulator group 56B.

Note that while herein constant data K is fed to accumulator group 56B via access portion 52B, it may be fed to accumulator group 56B directly.

Furthermore, constant data K may be data indicating the number of accumulators of accumulator group 56B that are activated, or it may be data provided to uniquely specify one or more accumulator AC(k) to be activated, respectively.

In the second embodiment, product-sum operation portion 5B receives an input with data added thereto to designate one or more accumulator AC(k) that is or are used in a product-sum operation to allow accumulator group 56B to calculate and hold a plurality of accumulation data ACC(k). In the first embodiment, only a single accumulator 56 is provided and if a plurality of product-sum operations need to be performed a single production-sum operation must first be completed before a subsequent product-sum operation starts. This may entail a constraint, such as controlling an order of performing an operation, and software may be complicated. In the second embodiment, in contrast, such a plurality of accumulation data ACC(K) as aforementioned can be calculated in parallel and held to overcome such a disadvantage as above.

In the present embodiment, instruction information of a data packet fed to product-sum operation portion 5B, i.e., a data flow program stored in program storage portion 2B, as described above, can be used to designate as desired an accumulator of a plurality of accumulators that is activated to hold an accumulation. As such, if a plurality of accumulation operations are performed in parallel, accumulator AC(k) to be activated can be designated, as desired, to match the level of the parallelism.

Third Embodiment

In the third embodiment shows a product-sum operator capable of receiving any read start addresses "i1" and "j1" for data tables 53 and 54 to start a product-sum operation from data of any address. More specifically, it can use constant data "i1", "j1" and CN to perform an operation in accordance with an arithmetic expression ACC=ACC+X(i)*Y(i) to obtain accumulation data ACC, wherein i=i1 to (i1+CN−1) and j1=j1 to (j1+CN−1).

Figure 8:
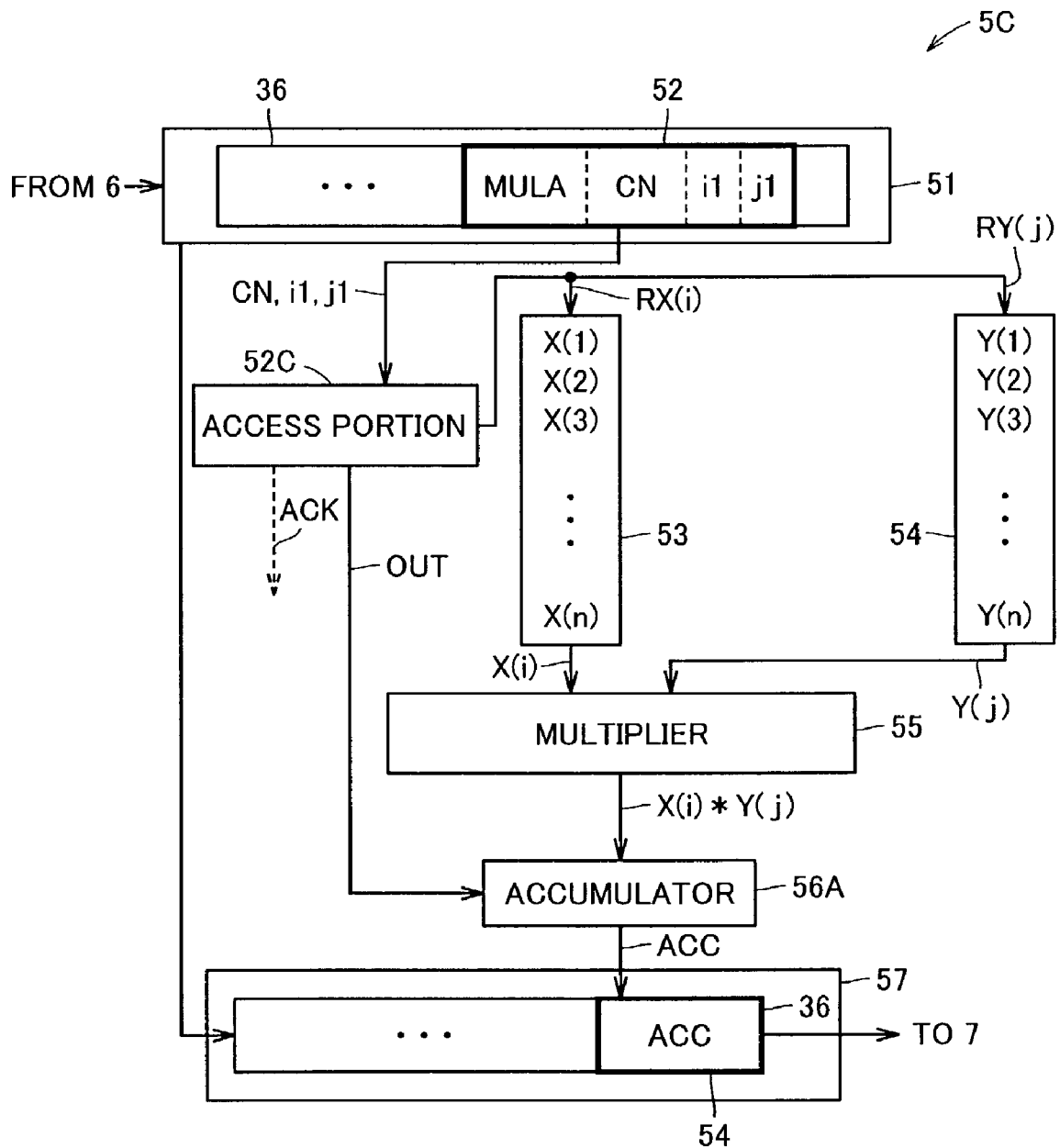
FIG. 8 shows a configuration of a product-sum operation portion 5C of a third embodiment.
Figure 9:
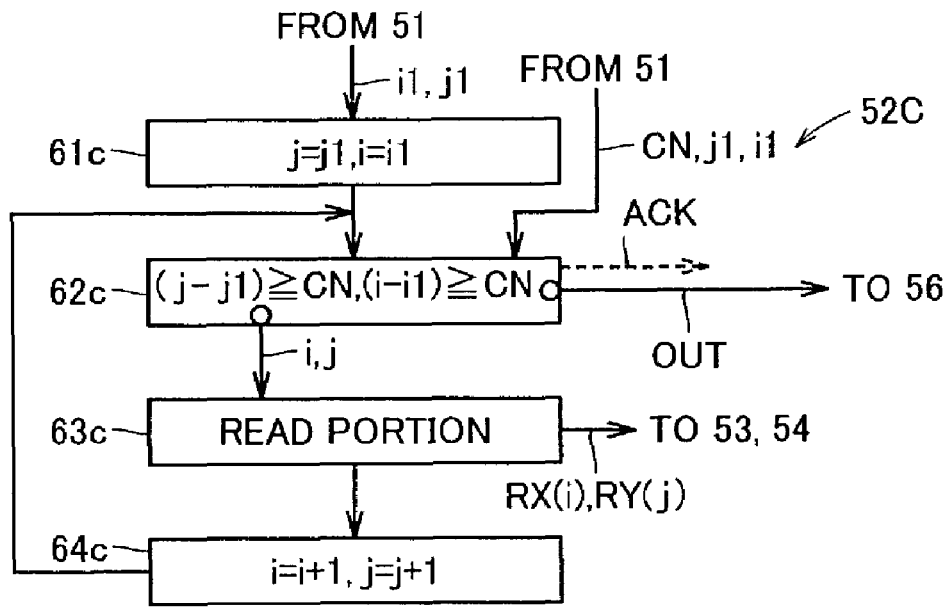
FIG. 9 shows a configuration of an access portion 52C of FIG. 8.

FIG. 8 shows a configuration of product-sum operation portion 5C of the third embodiment. Product-sum operation portion 5C is similar in configuration to product-sum operation portion 5A of the first embodiment shown in FIG. 2, except that access portion 52A of product-sum operation portion 5A is replaced with an access portion 52C. FIG. 9 shows a configuration of access portion 52C of FIG. 8.

Figure 10:
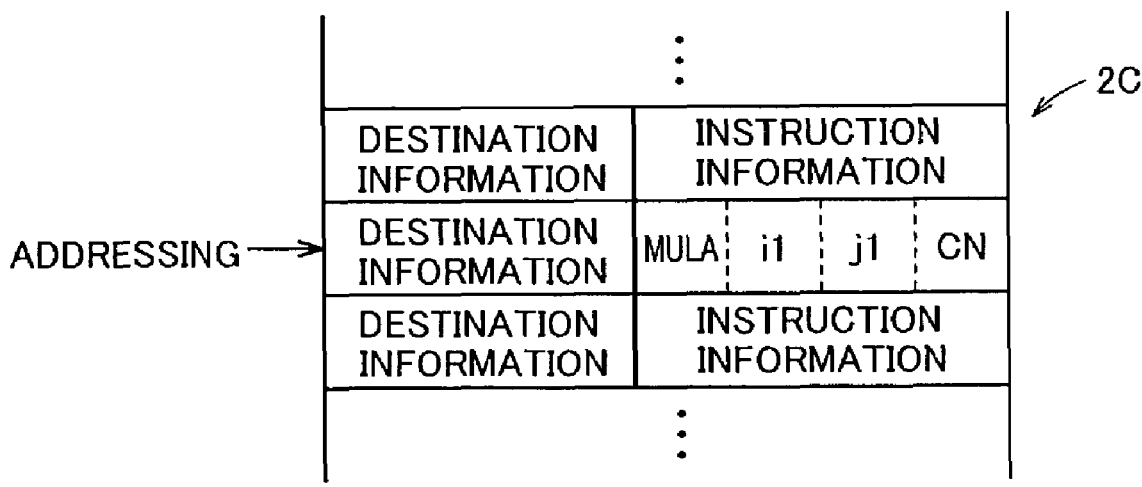
FIG. 10 shows exemplary content of a program storage portion 2C of the third embodiment.

FIG. 10 shows exemplary content of program storage portion 2C of the third embodiment. In the figure, program storage portion 2C previously stores a data flow program, as has been described previously. In the third embodiment when a product-sum operation instruction is executed a process is effected, as follows: as addressed in accordance with destination information of data packet 36 received, subsequent destination information and subsequent instruction information formed of instruction code MULA and constant data i1, j1 and CN are read from the data flow program in program storage portion 2C. The read, subsequent destination and instruction information are stored to the received data packet 36 at fields 53F and 52F, respectively, and the data packet 36 is output.

Constant data CN is provided as described previously, whereas constant data "i1" and "j1" indicate data read start addresses in data tables 53 and 54. In the each embodiment previously described, top addresses of data tables 53 and 54 are each fixed to be a data read start address, whereas in the present embodiment, data read start addresses are designated by constant data "i1" and "j1", respectively, as desired.

Access portion 52C receives constant data CN, "i1" and "j1" and in accordance therewith generates signals RX(i) and RY(j) for accessing data tables 53 and 54, and in response to the generated signals RX(i) and RY(j) reads data X(i) and Y(j) from data tables 53 and 54 in parallel and feeds the data to multiplier 55. In multiplier 55 and accumulator 56A, as has been described previously, data X(i) and Y(j) are multiplied by each other and resultant multiplication data X(i)*Y(j) is accumulated, and resultant accumulation data ACC is fed to output buffer 57. Thus from output buffer 57 data packet 36 input to product-sum operation 5C is output to junction portion 7, with accumulation data ACC stored in field 54F.

With reference to FIG. 9, access portion 52C includes a register 61C for variables "i" and "j", a comparator 62C, a read portion 63C, and an incrementor 64C. In operation, when input buffer 51 receives data packet 36, input buffer 51 outputs constant data CN which is in turn fed to comparator 62C, and input buffer 51 similarly outputs constant data "i1" and "j1" which are in turn fed to register 61C and comparator 62C.

In register 61C, for variable "j" the fed constant data "j1" is set and for variable "i" the fed constant data "i1" is set. The contents set in register 61C are fed to comparator 62C. If for the fed variables "i" and "j" and constant data CN a relation (j−j1)≧CN and a relation (I−i1)≧CN are not established, comparator 62C feeds variables "j" and "i" to read portion 63C. If the relationships are established, it outputs signal OUT to accumulator 56A.

Read portion 63C receives variables "i1" and "j1" and in accordance therewith outputs signals RX(i) and RY(j) to data tables 53 and 54 and also feeds the received variables "i" and "j" to incrementor 64C. Incrementor 64C receives variables "i" and "j", increments the variables by one and feeds the incremented variables to comparator 62C.

While herein that data read start addresses in data tables 53 and 54 can variably be set has been described as being applied to the first embodiment, it can similarly be applied in the second embodiment.

As such, setting any constant data "i1" and "j1" in field 52F of data packet 36 fed to product-sum operation portion 5C allows a product-sum operation to be started from data of any address of data tables 53 and 54.

Fourth Embodiment

Figure 11:
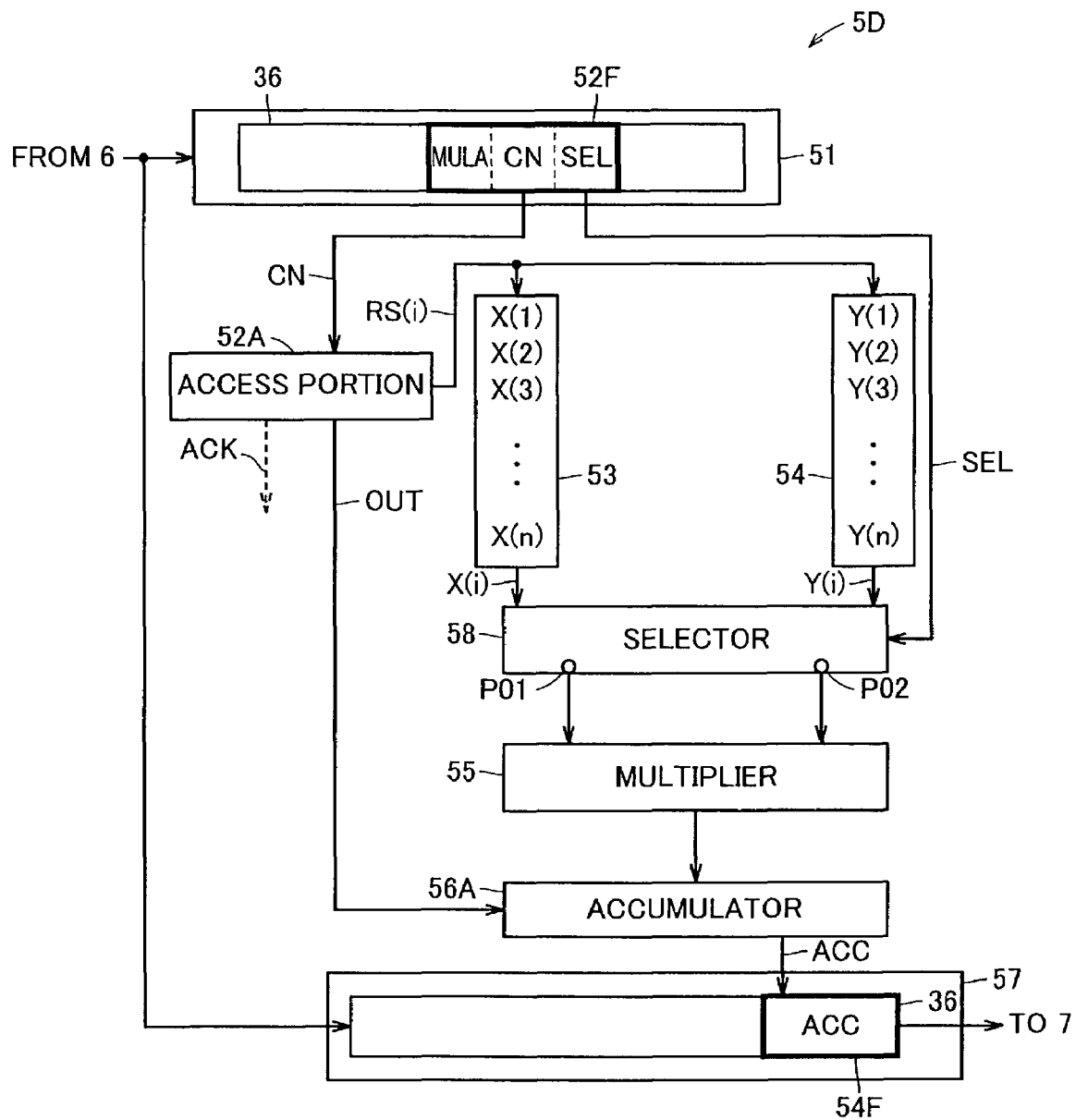
FIG. 11 shows a configuration of a product-sum operation portion 5D of a fourth embodiment.

FIG. 11 shows a configuration of a product-sum operation portion 5D of the fourth embodiment. The FIG. 11 product-sum operation portion 5D is adopted in a system frequently performing a power calculation or any other similar operation such as $X^2$.

In the fourth embodiment, constant data CN and SEL are used. In the present embodiment, a process is provided in accordance with arithmetic expressions ACC=ACC+X(i)*Y(i), ACC=ACC+X(i)*X(i), and ACC=ACC+Y(i)*Y(i) to obtain accumulation data ACC, wherein i=1 to CN.

As shown in FIG. 11, product-sum operation portion 5D includes an input buffer 51, an access portion 52A, a data table 53, a data table 54, a multiplier 55, an accumulator 56A, a selector 58 having output ports PO1 and PO2 outputting data to multiplier 55, and an output buffer 57. The components other than selector 58 are similar in configuration to those of the first embodiment.

Figure 12:
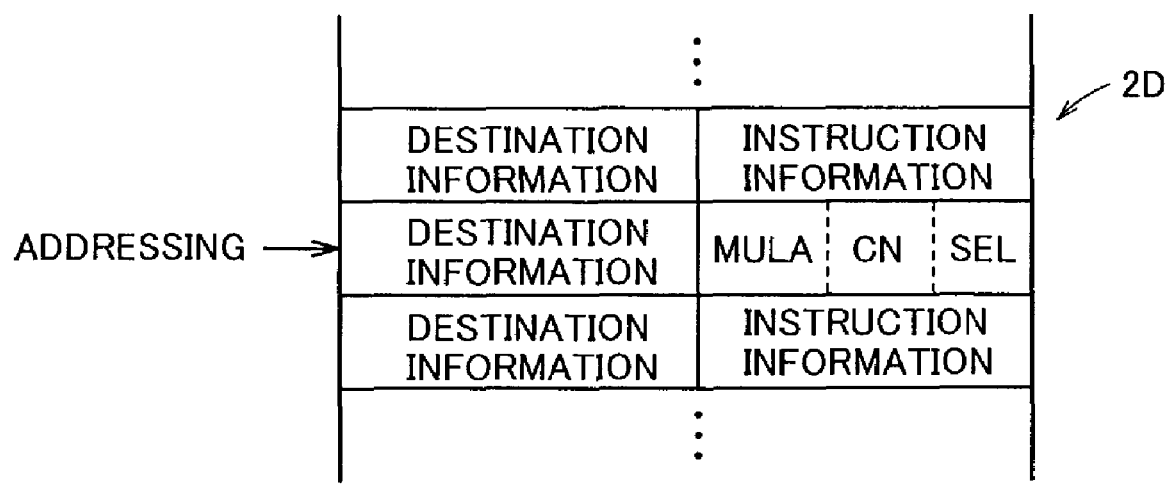
FIG. 12 shows exemplary content of a program storage portion 2D of the fourth embodiment.
Figure 14:
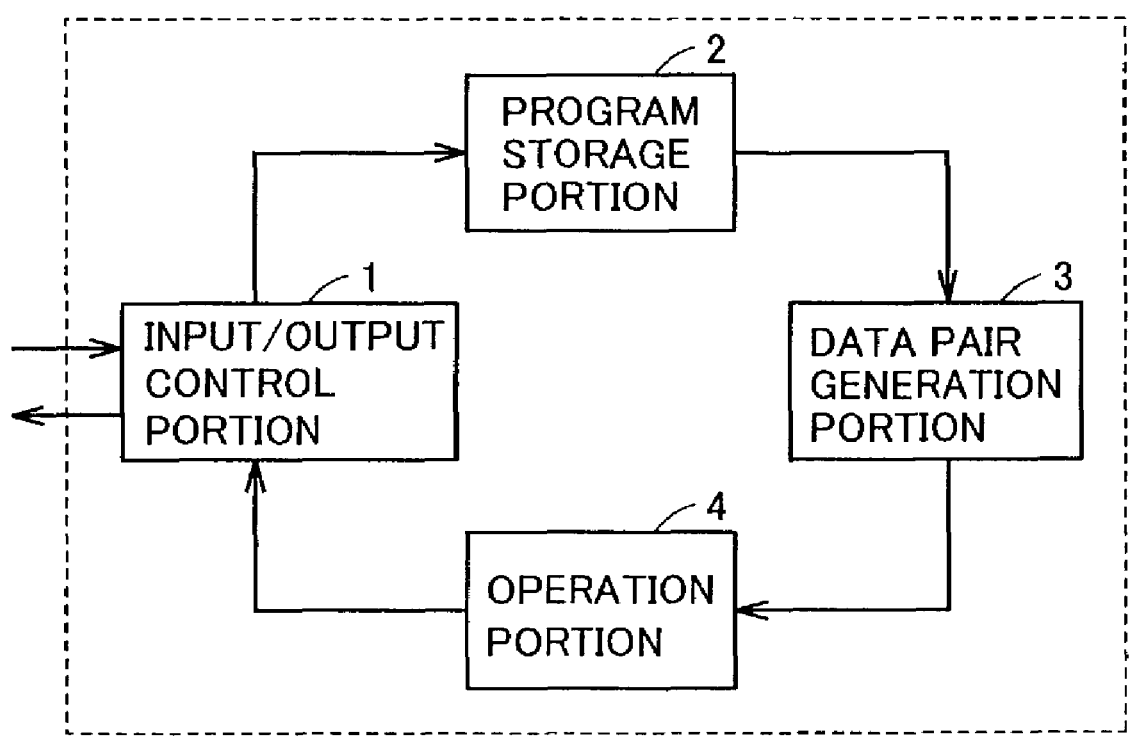
FIG. 14 shows a configuration of a data driven information processor as disclosed in Japanese Patent Laying-Open No. 6-60206.
Figures 15A, 15B:
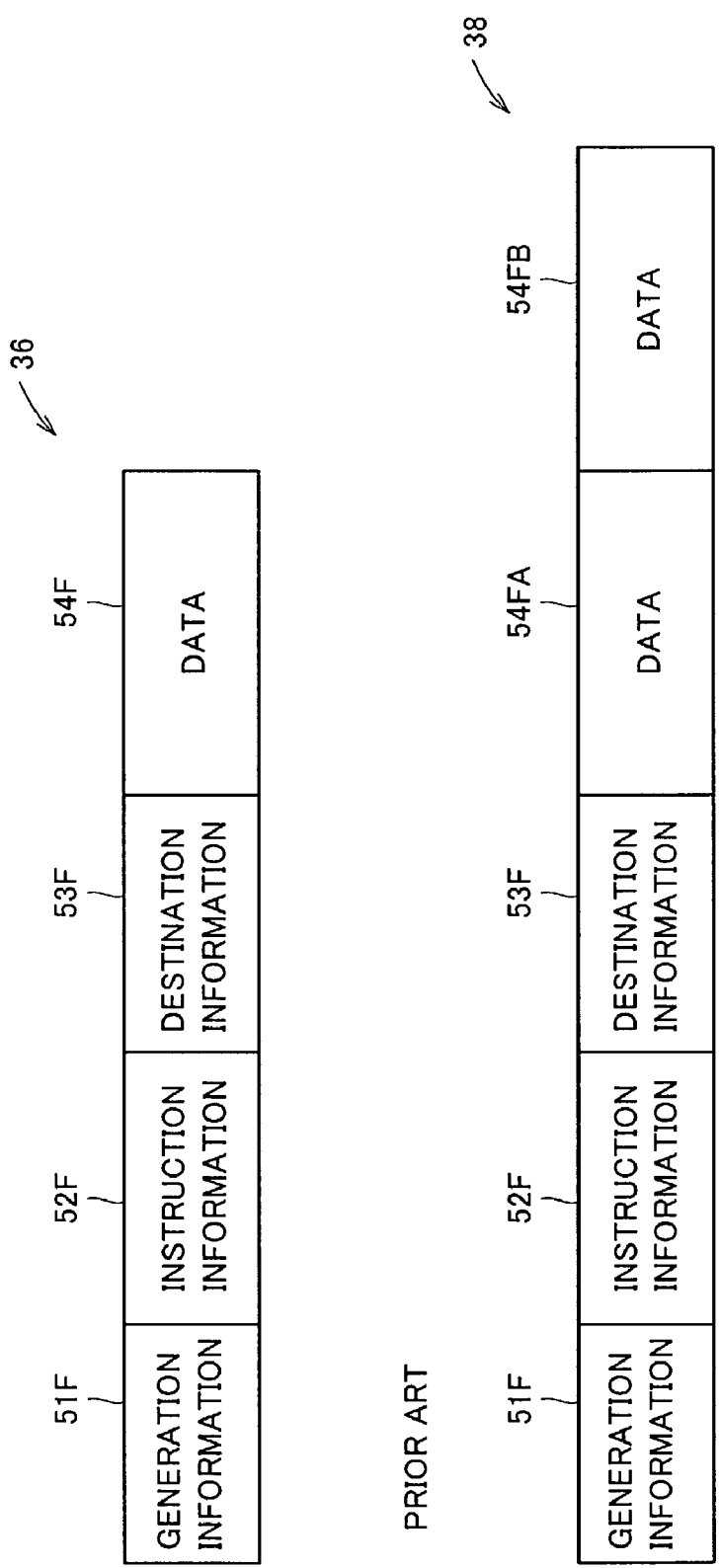
FIGS. 15A and 15B show configurations in field of data packets in the FIG. 14 data driven information processor.
Figure 16:
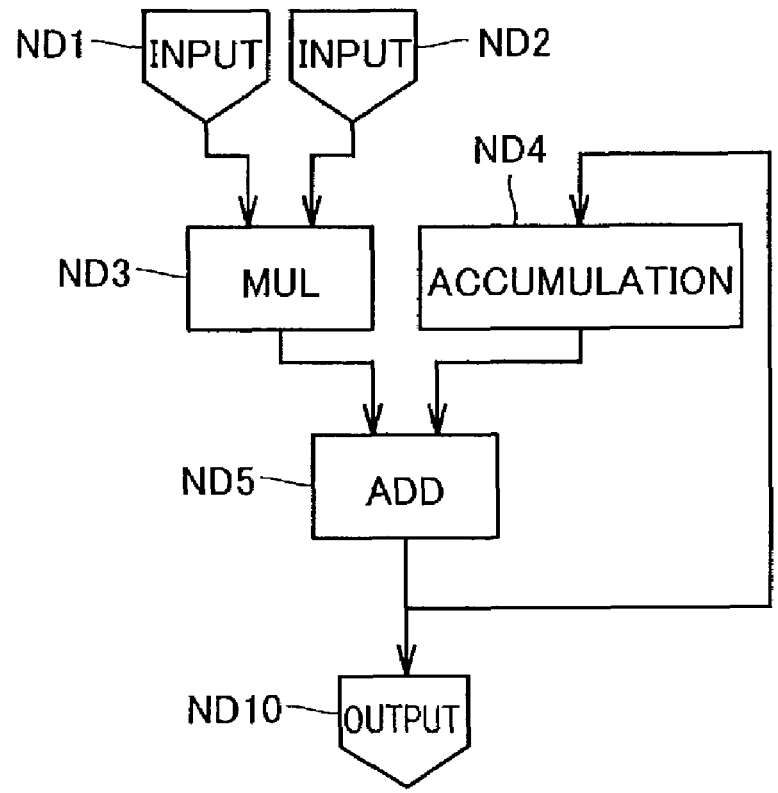
FIG. 16 is a data flow graph corresponding to a product-sum operation performed in the FIG. 14 data driven information processor.
Figure 17:
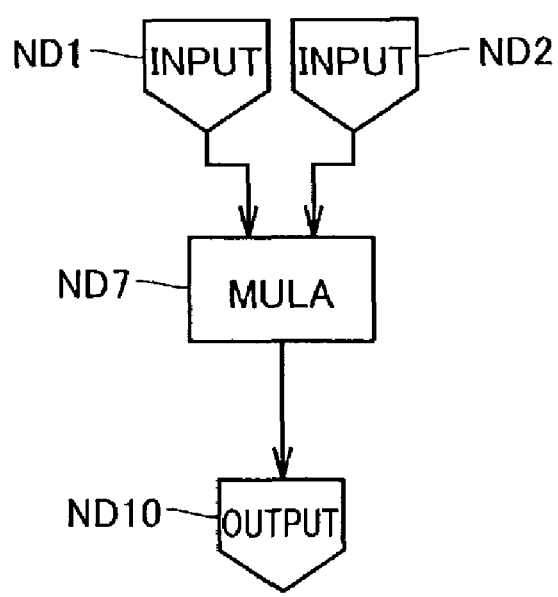
FIG. 17 is a data flow graph for performing a product-sum operation in a data driven information processor using an operation portion incorporating an accumulator.
Figure 18:
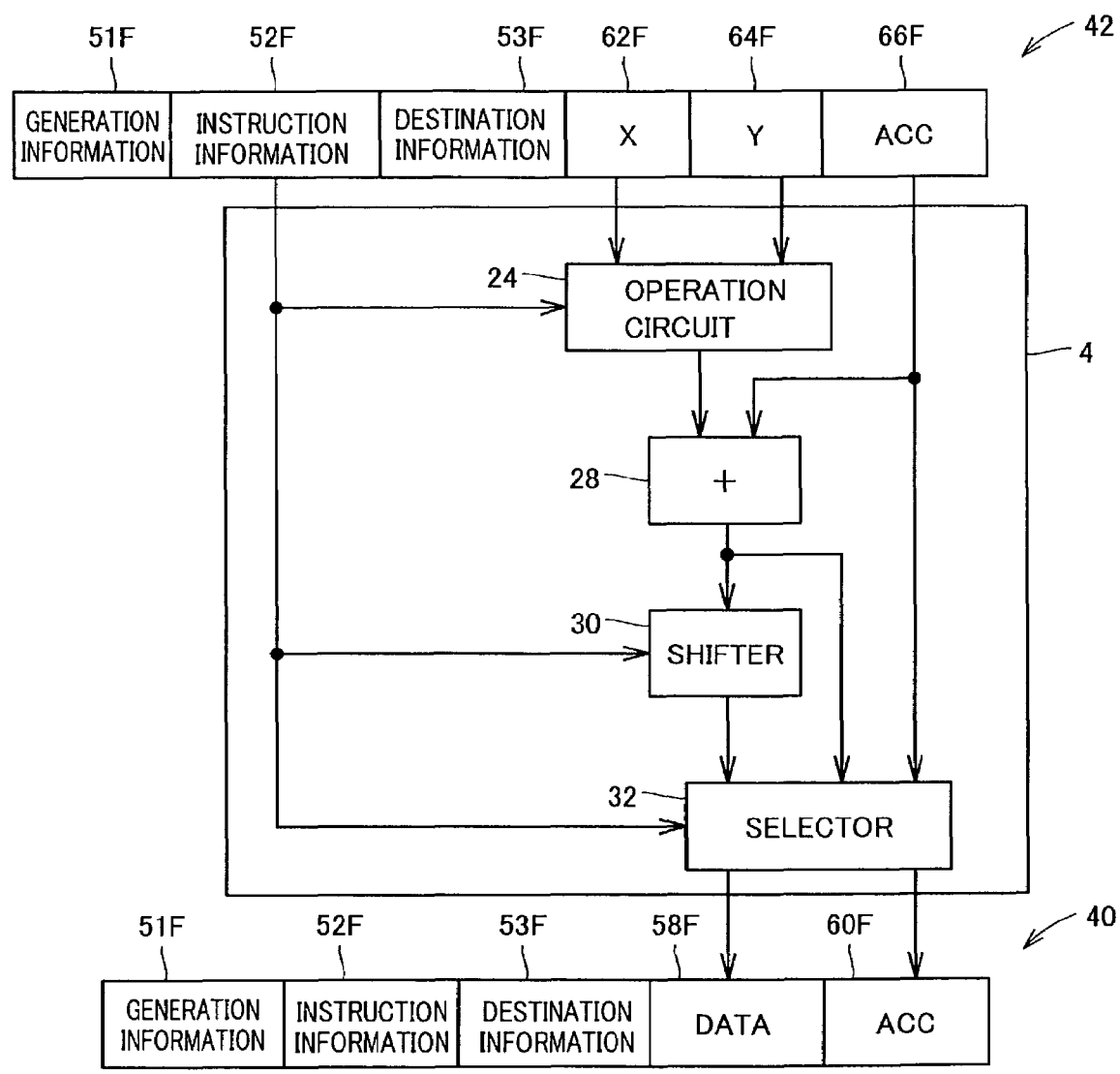
FIG. 18 shows an operation portion as disclosed in Japanese Patent Laying-Open No. 8-329038.

FIG. 12 shows exemplary content of program storage portion 2D of the fourth embodiment. In the figure, program storage portion 2D previously stores a data flow program, as has been described previously. In the fourth embodiment when a product-sum operation instruction is executed a process is effected, as follows: as addressed in accordance with destination information of data packet 36 received, subsequent destination information and subsequent instruction information formed of instruction code MULA and constant data CN and SEL are read from the data flow program in program storage portion 2D. The read, subsequent destination and instruction information are stored to the received data packet 36 at fields 53F and 52F, respectively. Thereafter, the data packet 36 is output. Note that constant data SEL is referenced to allow selector 58 to selectively receive fed data.

Data packet 36 fed from branch portion 6 to product-sum operation portion 5D is stored to input and output buffers 51 and 57. When data packet 36 is stored to input buffer 51, constant data CN in field 52F of the data packet 36 is fed to access portion 52A and constant data SEL is fed to selector 58. Access portion 52A operates in accordance with fed constant data CN to generate a signal RS(i) in order and in accordance with signal RS(i) reads data X(i) and Y(i) from data tables 53 and 54 in parallel and outputs the data to multiplier 58.

Selector 58 receives data X(i) and Y(i) fed in parallel and in accordance with the value of constant data SEL outputs the received data selectively to multiplier 55. More specifically, when constant data SEL indicates "1" selector 58 outputs data X(i) and Y(i) at output ports PO1 and PO2, respectively. When constant data SEL indicates "2" selector 58 outputs the received data X(i) at output ports PO1 and PO2, respectively. When constant data SEL indicates "3" selector 58 outputs the received data Y(i) at output ports PO1 an PO2, respectively. As such, for constant data SEL indicating "1", "2" and "3" accumulator 55 outputs accumulation data X(i)*Y(i), X(i)*X(i) and Y(i)*Y(i), respectively, to accumulator 56A.

When access portion 52A completes reading data from data tables 53 and 54 in accordance with constant data CN, access portion 52A outputs signal OUT to accumulator 56A. Accumulator 56A accumulates multiplication data output from multiplier 55, as described in the first embodiment. Thereafter when accumulator 56A receives signal OUT its currently stored accumulation data ACC is output to output buffer 57.

Output buffer 57 receives accumulation data ACC and stores it to field 54F of data packet 36 previously stored in output buffer 57. Thereafter, the data packet 36 is read from output buffer 57 and output to junction portion 7.

In the fourth embodiment product-sum operation portion 5D allows data read from data tables 53 and 54 to be selectively output via selector 58 in accordance with constant data SEL to multiplier 55 to allow for such a power calculation as described above.

While product-sum operation portion 5D of the present embodiment corresponds to product-sum operation portion 5A of the first embodiment plus selector 58, it may be product-sum operation portion 5B and 5C of the second and third embodiments plus selector 58.

Furthermore, the product-sum operation portion may have three types or more of data tables and selector 58 may output at output ports PO1 and PO2 to multiplier 55 one or more of three or more types of data read from the data tables that is or are selected by constant data SEL.

Fifth Embodiment

The fifth embodiment provides a product-sum operator capable of effecting a process when a preceding, repetitive operation involved in a product-sum operation is being performed. The present embodiment allows product-sum operation portions 5A–5D of the first to fourth embodiments to perform a product-sum operation without putting off a subsequent process. The FIG. 1 data driven information processor can be free of data packet residing therein and hence from poor operation efficiency.

More specifically in FIG. 1 when each component is ready to accept a data packet from a preceding component it outputs the proceeding component a signal Acknowledge (ACK) indicating that it is ready to accept a data packet. This means that the preceding component receives a signal permitting the preceding component to output a data packet to the subsequent component. Signal ACK allows a data packet to be transmitted between the components.

As such, branch portion 6 outputs to product-sum operation portion 5A (5B, 5C, 5D) data packet 36 having stored therein instruction information containing instruction code MULA for a product-sum operation. Product-sum operation portion 5A (5B, 5C, 5D) completes the product-sum operation and outputs signal ACK to branch portion 6. Branch portion 6 in response outputs signal ACK to data pair generation portion 3. Furthermore, branch portion 6 outputs to operation portion 4 data packet 36 or 38 having stored therein instruction information of a type different from a product-sum operation. Operation portion 4 completes an operation in accordance with the instruction information and outputs signal ACK to branch portion 6. Branch portion 6 in response outputs signal ACK to data pair generation portion 3.

In the present embodiment, access portion 52A (52B, 52C) of product-sum operation portion 5A (5B, 5C, 5D), as shown in FIGS. 2, 3, 5, 6, 9 and 11, outputs signal ACK together with signal OUT. However, signal ACK may be output, as timed differently. For example, it may be output when output buffer 57 outputs a data packet.

Thus product-sum operation portion 5A (5B, 5C, 5D) performs a product-sum operation process and in parallel therewith operation portion 4 can perform a subsequent operation process in relation to data packet 36 or 38 to prevent data packet 36 or 38 from residing in the information processor as it performs a repetitive operation involved in the product-sum operation.

Sixth Embodiment

If an FIR filtering operation is frequently performed, a filter coefficient is set in data Y(j) of data table 54 and data is set in data X(i) of data table 53. For example, if an FIR filtering operation having eight filter coefficients is performed, then in data table 54 addresses 1–8 are constantly applied or a variable "j" constantly increments by one from one to eight, while data Y(j) is accessed and read. In parallel, in address table 53 a data read start address is offset sequentially, i.e., variable "i" increments by one, while data X(i) is addressed and read. The data thus read in parallel are operated on. Furthermore, if data is updated one by one, adding a scheme allowing a circulation only from one through eight can save a region of the data table.

FIGS. 13A–13C represent exemplary arithmetic expressions in such a case. In FIG. 13A, T=0 represents a time axis t=0. In FIG. 13B, T=1 represents time axis t=1. In FIG. 13C, T=2 represents time axis t=2. The FIGS. 13A–13C arithmetic expressions each include eight taps.

Seventh Embodiment

In each of the above embodiments it is not a requirement that data tables 53 and 54 be dedicated to a product-sum operation. Data tables 53 and 54 may be provided to be shared with a memory region accessed when a different type of operation is performed. In that case, storing results of different types of operation to data tables 53 and 54, respectively, can eliminate a specific procedure followed to store operand data to data tables 53 and 54 for a product-sum operation instruction, so that operation can be effected more efficiently.

While in each of the above embodiments multiplier 55 effects a multiplication using operands corresponding to two data read from data table 53 and 54, three or more data tables may be provided to provide three or more operands.

While in each of the above embodiments, multiplier 55 provides a plurality of products which are in turn summed up by a product-sum operation, the multiplier may be replaced for example with a divider or a subtractor to obtain a sum of a plurality of quotients of differences.

In each of the above embodiments, circulating data round the FIG. 1 data driven information processor DDP through each component only once allows a desired product-sum operation to be performed and completed. Herein, if a data packet requires one unitary period of time to move past the FIG. 1 branch portion 6, product-sum operation portion 5A (5B, 5C, 5D) and junction portion 7, then executing a single product-sum operation instruction, for example a product-sum operation instruction with ten taps requires four unitary periods of time to allow the data packet to circulate round information processor DDP and ten unitary periods of time (a period of time required for the ten taps), resulting in a total of 14 unitary periods of time, so that data driven information processor DDP can perform a product-sum operation faster than conventional as described above. Strictly speaking, the time required for product-sum operation portion 5A (5B, 5C, 5D) to perform a product-sum operation is shorter than that required for the data packet to move past a single component of data driven information processor DDP, and a effect more than the above can be expected in performing the process fast.

Conventionally in performing a product-sum operation a data packet circulates round a data driven information processor by a product frequency. In each of the above embodiments such a circulation can be eliminated to perform the product-sum operation. Furthermore, if product-sum operation portion 5A (5B, 5C, 5D) is performing a product-sum operation, a different type of operation can be performed in parallel to reduce residence of a data packet and thus prevent decreased efficiency of operation.

In each of the above embodiments, a product-sum operation can be performed in periods of time shorter by 2.9 times or more for 10 taps, 3.3 times or more for 20 taps, and 3.7 times or more for 50 taps, respectively, than conventional.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data processor comprising:
program storage means having stored therein a data flow program formed of a plurality of destination information and a plurality of instruction information, receiving a data packet at least having a destination field for storage of said destination information, an instruction field for storage of said instruction information and a data field for storage of data, reading subsequent said destination information and said instruction information from said data flow program by addressing based on subsequent content of said destination field of the received data packet, storing the read subsequent destination information and instruction information to said destination field and said instruction field, respectively, of the received data packet, and outputting the received data packet;
paired-data detection means receiving said data packet from said program storage means, storing to the received data packet a content required to execute said instruction information in said instruction field of the received data packet, and outputting the received data packet;
accumulation means having a plurality of tables with data registered therewith, receiving said data packet, performing in accordance with said instruction information in said instruction field of the received data packet an arithmetic operation on said data read from said plurality of tables, accumulating a result of the arithmetic operation in an accumulation operation performed repeatedly, storing a result of the repetitive accumulation operation to said data field of the received data packet, and outputting the received data packet;
operation means receiving said data packet, processing said data in a corresponding said data field in accordance with said instruction information in said instruction field of the received data packet, storing resultant processed data to the data field, and outputting the received data packet;
branch means receiving said data packet from said paired-data detection means and outputting the received data packet to one of said accumulation means and said operation means in accordance with said instruction information in said instruction field of the received data packet; and
input/output control means receiving said data packet from said accumulation means and said operation means and outputting the received data packet externally or to said program storage means.

2. The data processor according to claim 1, wherein said instruction information in said data packet received by said accumulation means includes data designating a frequency of repetition of said accumulation operation.

3. The data processor according to claim 1, wherein said accumulation means has an accumulator sequentially receiving and accumulating a fed result of said arithmetic operation and holding a resultant accumulation while said accumulation operation is repeated.

4. The data processor according to claim 1, wherein said accumulation means has a plurality of accumulators sequentially receiving and accumulating a fed result of said arithmetic operation and holding a resultant accumulation while said accumulation operation is repeated.

5. The data processor according to claim 4, wherein:
said instruction information in said data packet received by said accumulation means includes accumulator designating data designating at least one of said plurality of accumulators to accumulate a result of said arithmetic operation; and
of said plurality of accumulators, at least one said accumulator designated by said accumulator designating data is activated.

6. The data processor according to claim 1, wherein said instruction information in said data packet received by said accumulation means includes data designating an address in said plurality of tables to start reading said data therefrom.

7. The data processor according to claim 1, wherein:
said instruction information in said data packet received by said accumulation means includes selector data for selecting data of an operand of said arithmetic operation from data read from said plurality of tables; and
said arithmetic operation is performed for data selected in accordance with said selector data.

8. The data processor according to claim 7, wherein in accordance with said selector data, data read from a single said table is selected as the data of the operand of said arithmetic operation.

9. A data processor comprising:
a program storage circuit having stored therein a data flow program formed of a plurality of destination information and a plurality of instruction information, receiving a data packet at least having a destination field for storage of said destination information, an instruction field for storage of said instruction information and a data field for storage of data, reading subsequent said destination information and said instruction information from said data flow program by addressing based on subsequent content of said destination field of the received data packet, storing the read subsequent destination information and instruction information to said destination field and said instruction field, respectively, of the received data packet, and outputting the received data packet;
a paired-data detection circuit receiving said data packet from said program storage circuit, storing to the received data packet a content required to execute said instruction information in said instruction field of the received data packet, and outputting the received data packet;

an accumulation circuit having a plurality of tables with data registered therewith, receiving said data packet, performing in accordance with said instruction information in said instruction field of the received data packet an arithmetic operation on said data read from said plurality of tables, accumulating a result of the arithmetic operation in an accumulation operation performed repeatedly, storing a result of the repetitive accumulation operation to said data field of the received data packet, and outputting the received data packet;

an operation circuit receiving said data packet, processing said data in a corresponding said data field in accordance with said instruction information in said instruction field of the received data packet, storing resultant processed data to the data field, and outputting the received data packet;

a branch circuit receiving said data packet from said paired-data detection circuit and outputting the received data packet to one of said accumulation circuit and said operation circuit in accordance with said instruction information in said instruction field of the received data packet; and an input/output control circuit receiving said data packet from said accumulation circuit and said operation circuit and outputting the received data packet externally or to said program storage circuit.

* * * * *